US009612460B2

(12) United States Patent
Wang et al.

(10) Patent No.: US 9,612,460 B2
(45) Date of Patent: Apr. 4, 2017

(54) LIQUID CRYSTAL FILLING DEVICE AND LIQUID CRYSTAL PANEL MANUFACTURING APPARATUS COMPRISING THE SAME

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Chen Wang, Beijing (CN); Fengzhen Lv, Beijing (CN); Xinxia Zhang, Beijing (CN); Xiao Guo, Beijing (CN); Kang Xiang, Beijing (CN); Kui Lv, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 236 days.

(21) Appl. No.: 14/548,936

(22) Filed: Nov. 20, 2014

(65) Prior Publication Data

US 2015/0346523 A1 Dec. 3, 2015

(30) Foreign Application Priority Data

May 29, 2014 (CN) .......................... 2014 1 0235918

(51) Int. Cl.
*G02F 1/13* (2006.01)
*G02F 1/1333* (2006.01)
*G02F 1/1341* (2006.01)

(52) U.S. Cl.
CPC .......... *G02F 1/1303* (2013.01); *G02F 1/1341* (2013.01); *G02F 1/133382* (2013.01)

(58) Field of Classification Search
CPC . G02F 1/1303; G02F 1/1341; G02F 1/133382
See application file for complete search history.

(56) References Cited

U.S. PATENT DOCUMENTS

| 5,548,428 A | 8/1996 | Masaki et al. |
| 2005/0008766 A1* | 1/2005 | Sakurada ............. G02F 1/1341 427/64 |

FOREIGN PATENT DOCUMENTS

| CN | 1395133 A | 2/2003 |
| CN | 1395134 A | 2/2003 |

(Continued)

OTHER PUBLICATIONS

Office Action dated Mar. 28, 2016 issued in Chinese Application No. 201410235918.4.

(Continued)

*Primary Examiner* — Donald Raleigh
*Assistant Examiner* — Kevin Quarterman
(74) *Attorney, Agent, or Firm* — Nath, Goldberg & Meyer; Joshua B. Goldberg

(57) ABSTRACT

The present invention relates to the field of liquid crystal panel manufacturing, and provides a liquid crystal filling device and a liquid crystal panel manufacturing apparatus. The technical solutions of the present invention solve the problem of ionic contamination of liquid crystal due to a quick diffusion rate of liquid crystal dropped on a substrate through an existing liquid crystal filling device. In embodiments of the present invention, the liquid crystal filling device includes a substrate stage and a support used for supporting a liquid crystal container. A first temperature adjustment device is provided on the support, which is used to lower the temperature of the liquid crystal in the liquid crystal container, such that the viscosity coefficient of the liquid crystal in the liquid crystal container is increased. The (Continued)

liquid crystal panel manufacturing apparatus includes the above liquid crystal filling device.

12 Claims, 1 Drawing Sheet

(56) References Cited

FOREIGN PATENT DOCUMENTS

| | | |
|---|---|---|
| CN | 1928672 A | 3/2007 |
| CN | 201429756 Y | 3/2010 |
| CN | 102032753 A | 4/2011 |
| CN | 202022750 U | 11/2011 |
| CN | 103383508 A | 11/2013 |
| JP | 2002059055 A | 2/2002 |

OTHER PUBLICATIONS

Office Action issued Jul. 27, 2016 in corresponding Chinese Application No. 201410235918.4.

* cited by examiner

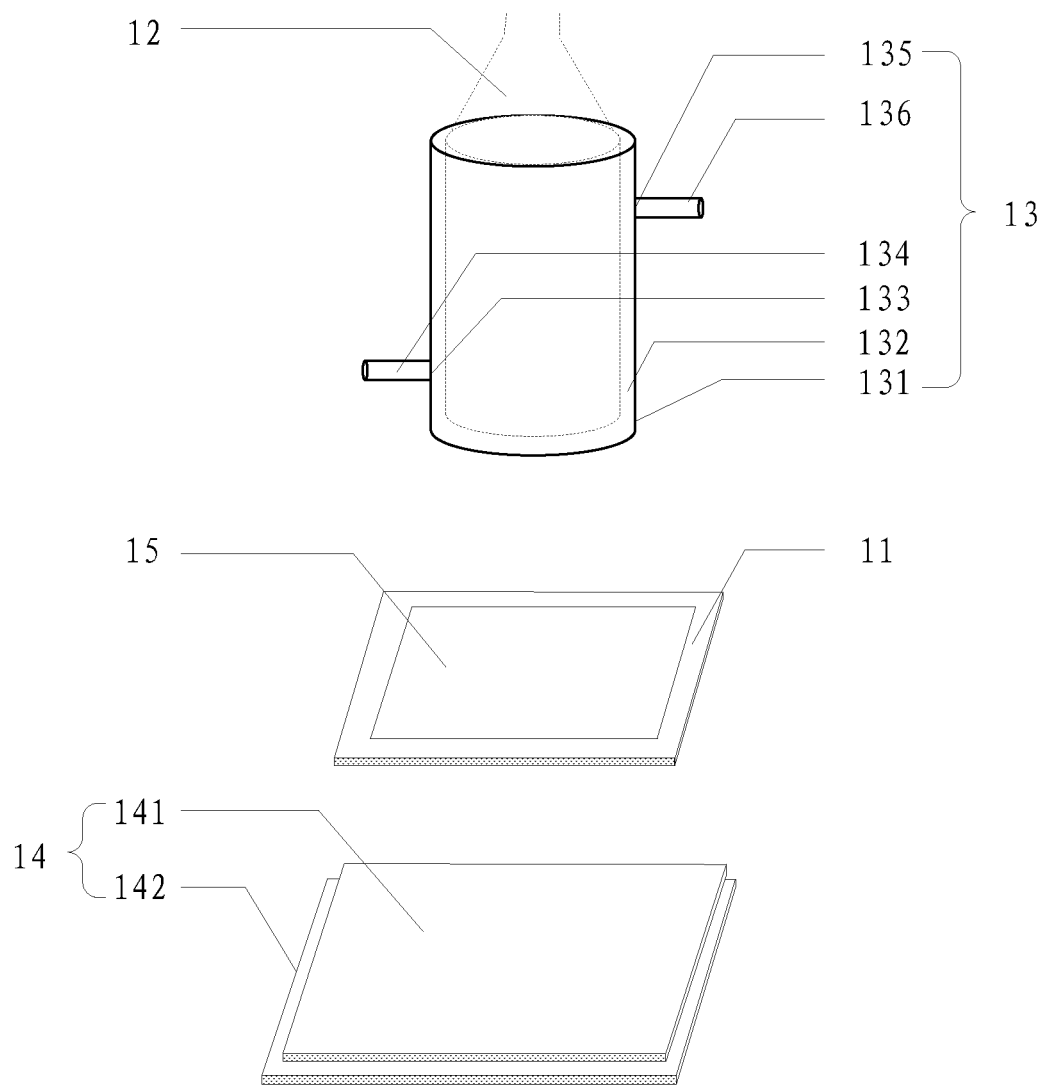

LIQUID CRYSTAL FILLING DEVICE AND LIQUID CRYSTAL PANEL MANUFACTURING APPARATUS COMPRISING THE SAME

CROSS-REFERENCE TO RELATED APPLICATION

This application claims priority under 35 U.S.C. §119 to Chinese Patent Application No. 201410235918.4, filed on May 29, 2014, in the Chinese Intellectual Property Office, the disclosure of which is incorporated by reference herein in its entirety.

FIELD OF THE INVENTION

The present invention relates to the field of liquid crystal panel manufacturing, and particularly relates to a liquid crystal filling device and a liquid crystal panel manufacturing apparatus comprising the same.

BACKGROUND OF THE INVENTION

In the manufacturing process of a liquid crystal panel, it is required to fill liquid crystal between an array substrate and a color filter substrate through a liquid crystal filling device.

Existing liquid crystal filling devices include a substrate stage and a support used for supporting a liquid crystal container. When filling liquid crystal, a substrate to be filled is mounted on the substrate stage, and the liquid crystal in the liquid crystal container is dropped onto the substrate. The filling process is performed under room temperature. When the color filter substrate and the array substrate are bonded so as to be assembled together, the edges of the opposite surfaces of the two substrates are coated with sealant, which is used to seal the liquid crystal in vacuum. The sealant is glue with viscosity at normal temperature. Therefore, the sealant needs to be cured through an UV pre-curing process and a high-temperature curing process after the liquid crystal has been sealed.

The vacuum sealed liquid crystal diffuses quickly along a rubbing direction of an alignment film on the surface of the substrate. Accordingly, ionic contamination of liquid crystal may occur due to that the quick diffused liquid crystal is contacted with the sealant not being cured, which causes edge mura and image sticking occurring on the liquid crystal panel. Furthermore, the display quality of the liquid crystal panel is affected.

To solve the problem, in the prior art, a solution of adding photo spacers or trenching on positions corresponding to black matrix at edges of a color filter substrate is proposed. However, a height difference will be generated in the color filter substrate at the position of photo spacer or trenching, so that an alignment film may be damaged and a rubbing mark may be generated when the rubbing alignment of the alignment film is performed. Also, adding photo spacers or trenching will add complexity to process. Furthermore, if the liquid crystal is dropped onto an array substrate, it is useless to add photo spacers or trenching on the color filter substrate to prevent the liquid crystal from diffusing.

SUMMARY OF THE INVENTION

Embodiments of the present invention provide a liquid crystal filling device and a liquid crystal panel manufacturing apparatus to solve the problem of ionic contamination of liquid crystal due to a quick diffusion rate of liquid crystal dropped on a substrate through an existing liquid crystal filling device.

To achieve the above objective, embodiments of the present invention employ the technical solutions as below.

A liquid crystal filling device includes a substrate stage and a support used for supporting a liquid crystal container. A first temperature adjustment device is provided on the support. The first temperature adjustment device is used to lower the temperature of liquid crystal in the liquid crystal container, such that the viscosity coefficient of the liquid crystal in the liquid crystal container is increased.

Further, the first temperature adjustment device includes a body that is used to accommodate the liquid crystal container therein. The body has a cavity to accommodate cooling liquid. The cavity is communicated with a liquid inlet pipe through a liquid inlet that is provided on the body and that penetrates a wall of the body, and the cavity is communicated with a liquid outlet pipe through a liquid outlet that is provided on the body and that penetrates the wall of the body.

Preferably, the cooling liquid is water.

Preferably, the liquid crystal filling device further includes a second temperature adjustment device that is provided on a rear surface of the substrate stage opposite to a front surface of the substrate sage that is used to load a substrate. The second temperature adjustment device is used to lower the temperature of the substrate stage.

Selectively, the second temperature adjustment device includes a thermoelectric module.

Preferably, the liquid filling device further includes an airtight chamber filled with dry gas. The substrate stage, the support and the first temperature adjustment device are located within the airtight chamber.

Preferably, the dry gas is nitrogen.

A liquid crystal panel manufacturing apparatus, the liquid crystal panel manufacturing apparatus includes the liquid crystal filling device.

In the liquid crystal filling device and the liquid crystal panel manufacturing apparatus comprising the same provided by the embodiments of the present invention, by controlling the first temperature adjustment device to lower the temperature of the liquid crystal, the viscosity coefficient of the liquid crystal can be increased. Along a rubbing direction of an alignment film, the diffusion rate of the liquid crystal dropped on a substrate slows down. The possibility of ionic contamination of the liquid crystal caused by the liquid crystal contacting with sealant not being cured is reduced. Therefore, the possibility of edge mura and image sticking occurring on the liquid crystal panel is reduced, and the display quality of the liquid crystal panel is improved.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by ordinary person skilled in the art without any creative effort.

FIG. 1 is a schematic diagram showing a structure of a liquid crystal filling device provided by an embodiment of the present invention.

DETAILED DESCRIPTION OF THE EMBODIMENTS

A clear and complete description of technical solutions of the embodiments of the present invention will be given below in combination with the accompanying drawings in the embodiments of the present invention. Apparently, the embodiments described below are merely a part, but not all, of the embodiments of the present invention. All of other embodiments, obtained by a person skilled in the art based on the embodiments of the present invention without any inventive efforts, fall into the protection scope of the present invention.

An embodiment of the present invention provides a liquid crystal filling device, as shown in FIG. 1. The liquid crystal filling device includes a substrate stage 11 and a support (not shown in FIG. 1) used for supporting a liquid crystal container 12. A first temperature adjustment device 13 is provided on the support. The first temperature adjustment device 13 is used to lower the temperature of the liquid crystal in the liquid crystal container 12, such that the viscosity coefficient of the liquid crystal in the liquid crystal container 12 is increased.

The viscosity coefficient of liquid crystal is relative to the temperature of liquid crystal. The higher the temperature of liquid crystal is, the smaller the viscosity coefficient of liquid crystal is; the lower the temperature of liquid crystal is, the larger the viscosity coefficient of liquid crystal is. In the liquid crystal filling device provided by embodiments of the present invention, a first temperature adjustment device is provided on a support. By controlling the first temperature adjustment device to lower the temperature of liquid crystal, the viscosity coefficient of the liquid crystal can be increased. Along a rubbing direction of an alignment film, the diffusion rate of the liquid crystal dropped on a substrate slows down. The possibility of ionic contamination of the liquid crystal caused by the liquid crystal contacting with sealant not being cured is reduced. Therefore, the possibility of edge mura and image sticking occurring on a liquid crystal panel is reduced, and the display quality of the liquid crystal panel is improved.

In the liquid crystal filling device as shown in FIG. 1, the first temperature adjustment device 13 may include a body 131 that is used to accommodate the liquid crystal container 12 therein. The body 131 has a cavity 132 to accommodate cooling liquid. The cavity 132 is communicated with a liquid inlet pipe 134 through a liquid inlet 133 that is provided on the body 131 and that penetrates a wall of the body 131, and the cavity 132 is communicated with a liquid outlet pipe 136 through a liquid outlet 135 that is provided on the body and that penetrates the wall of the body.

Because the cavity 132 is communicated with the liquid inlet pipe 134 through the liquid inlet 133 that is provided on the body 131 and that penetrates the wall of the body 131, and the cavity 132 is communicated with the liquid outlet pipe 136 through the liquid outlet 135 that is provided on the body and that penetrates the wall of the body, the cooling liquid flows from the liquid inlet pipe 134 into the cavity 132 via the liquid inlet 133, then the cooling liquid flows into the liquid outlet pipe 136 via the liquid outlet 135. Thus, the cooling liquid in the cavity 132 is always in a circulating status, such that the first temperature adjustment device 13 has continuous cooling effect. Therefore, the temperature of the liquid crystal container 12 placed in the body 131 is lowered, and the purpose of lowering the temperature of the liquid crystal in the liquid crystal container 12 is achieved.

In the first temperature adjustment device 13 provided by the embodiment of the present invention, preferably, the cooling liquid in the cavity 132 is water. That is because water is easy to be obtained and has low cost. However, the present invention is not limited thereto. The person skilled in the art may select other cooling liquid base on actual practices, as long as the liquid crystal in the liquid crystal container 12 can be cooled.

It should be noted that the cooling of liquid crystal requires a certain time. Therefore, before filling liquid crystal onto a substrate, it is necessary to pre-cool the liquid crystal in the liquid crystal container 12. Due to the diversities of the thermal conductivity of the liquid crystal container 12, the amount of the liquid crystal in the liquid crystal container 12 and the tightness of the first temperature adjustment device 13, the time required to cool the liquid crystal is different. Therefore, the pre-cool time should be measured before filling the liquid crystal.

Moreover, it should be noted that the first temperature adjustment device 13 of the present invention is not limited to the structure as shown in FIG. 1. Other structures that can be used to lower the temperature of liquid crystal may be employed in the present invention.

Further, the first temperature adjustment device 13 may also has a heating function. For liquid crystal with large viscosity coefficient, although the problem of quick diffusion will not exist, it is difficult to control the size of droplets of the liquid crystal dropped on the substrate from the liquid crystal container 12. Therefore, the liquid crystal should be suitably heated by making use of the heating function of the first temperature adjustment device 13, such that the viscosity coefficient of the liquid crystal is decreased, and the purpose of accurately control the size of the droplets is achieved.

In the liquid crystal filling device provided by an embodiment of the present invention, a second temperature adjustment device 14 may be further included, which is provided on a rear surface of the substrate stage 11 opposite to a front surface of the substrate stage 11 that is used to load a substrate 15. The second temperature adjustment device 14 is used to lower the temperature of the substrate stage 11, and then the temperature of the substrate 15 and the temperature of the liquid crystal on the substrate 15 are lowered due to heat conduction effect. Therefore, the viscosity coefficient of the liquid crystal is further reduced, and the diffusion rate of the liquid crystal slows down, such that the possibility of sealant contacting with the liquid crystal is reduced. Therefore, the possibility of edge mura and image sticking occurring on liquid crystal panel is reduced.

In the liquid crystal filling device provided by the above embodiment, the second temperature adjustment device 14 may include a semiconductor chilling plate. The semiconductor chilling plate is a type of cooling device that consists of an N-type semiconductor and a P-type semiconductor, and has an anode and a cathode.

When the semiconductor chilling plate is forward biased (that is, the anode 141 of the semiconductor chilling plate is connected with a positive pole of a power supply, and the cathode 142 of the semiconductor chilling plate is connected with a negative pole of the power supply), a cooling effect can be achieved, such that the temperature of the liquid crystal can be lowered.

In addition, it should be noted that when the semiconductor chilling plate is backward biased (that is, the anode 141 of the semiconductor chilling plate is connected with a negative pole of the power supply, and the cathode 142 of the semiconductor chilling plate is connected with the positive pole of the power supply), a heating effect can be achieved. Generally, after an array substrate and a color filter substrate are bonded so as to be assembled together, sealant is required to be cured in a specific apparatus, such that a liquid crystal panel is produced. In a case that the vacuum sealed liquid crystal has not been diffused sufficiently between the substrates, density bubbles may exist in the liquid crystal. By placing the produced liquid crystal panel on the substrate stage 11 of the liquid crystal filling device provided by the present invention, and then making the semiconductor chilling plate backward biased, a quick heating to the substrates can be achieved. Therefore, the viscosity coefficient of the liquid crystal on the substrates is reduced, and the diffusion rate thereof is speeded up. Thus, the density bubbles on the liquid crystal panel are eliminated.

The liquid crystal filling device provided by an embodiment of the present invention may further include an airtight chamber filled with dry gas (not shown in FIG. 1). Each of the substrate stage 11, the support and the first temperature adjustment device 13 may be located within the airtight chamber.

When the substrate stage 11, the support and the first temperature adjustment device 13 are exposed in an environment filled with regular room air, the moisture in air is likely to be condensed on the liquid crystal due to that the temperature of liquid crystal is lower than the room temperature. The moisture will be sealed between two substrates together with the liquid crystal, such that the working life of the liquid crystal panel is affected. By placing the substrate stage 11, the support and the first temperature adjustment 13 within the sealed chamber filled with dry gas, it is possible to prevent the working life of the liquid crystal panel from shortening due to the existing of moisture inside the liquid crystal panel.

In the liquid crystal filling device provided by the above embodiment of the present invention, preferably, the gas in the airtight chamber is nitrogen. This is because the chemical property of the nitrogen is stable, and it is unlikely to react with the liquid crystal.

An embodiment of the present invention further provides a liquid crystal panel manufacturing apparatus, which includes the liquid crystal filling device described in the above embodiments. Since the liquid crystal filling device can reduce the possibility of edge mura and image sticking occurring on the liquid crystal panel, the yield rate of production can be improved by using the liquid crystal panel manufacturing apparatus.

The embodiments described above are merely the specific implementations of the present invention, but the protection scope of the present invention is not limited thereto. The changes and alternatives made to the present invention within the technical scope disclosed in the present invention by the person skilled in the art should be covered by the protection scope of the present invention. Accordingly, the protection scope of the present invention is defined by the appended claims.

What is claimed is:

1. A liquid crystal filling device, including a substrate stage and a support used for supporting a liquid crystal container, wherein
 a first temperature adjustment device is provided on the support, and the first temperature adjustment device is used to lower the temperature of liquid crystal in the liquid crystal container, such that the viscosity coefficient of the liquid crystal in the liquid crystal container is increased, wherein
 the first temperature adjustment device includes a body that is used to accommodate the liquid crystal container therein, the body has a cavity to accommodate cooling liquid, the cavity is communicated with a liquid inlet pipe through a liquid inlet that is provided on the body and that penetrates a wall of the body, and the cavity is communicated with a liquid outlet pipe through a liquid outlet that is provided on the body and that penetrates the wall of the body.

2. The liquid crystal filling device according to claim 1, wherein
 the liquid crystal filling device further includes a second temperature adjustment device that is provided on a rear surface of the substrate stage opposite to a front surface of the substrate stage that is used to load a substrate, and the second temperature adjustment device is used to lower the temperature of the substrate stage.

3. The liquid crystal filling device according to claim 2, wherein
 the second temperature adjustment device includes a semiconductor chilling plate.

4. The liquid crystal filling device according to claim 1, wherein
 the cooling liquid is water.

5. A liquid crystal panel manufacturing apparatus, including the liquid crystal filling device of claim 1.

6. The liquid crystal panel manufacturing apparatus according to claim 5, wherein
 the liquid crystal filling device further includes a second temperature adjustment device that is provided on a rear surface of the substrate stage opposite to a front surface of the substrate stage that is used to load a substrate, the second temperature adjustment device is used to lower the temperature of the substrate stage.

7. The liquid crystal panel manufacturing apparatus according to claim 6, wherein
 the second temperature adjustment device includes a semiconductor chilling plate.

8. The liquid crystal panel manufacturing apparatus according to claim 5, wherein
 the cooling liquid is water.

9. A liquid crystal filling device, including a substrate stage and a support used for supporting a liquid crystal container, wherein
 a first temperature adjustment device is provided on the support, and the first temperature adjustment device is used to lower the temperature of liquid crystal in the liquid crystal container, such that the viscosity coefficient of the liquid crystal in the liquid crystal container is increased, wherein
 the liquid filling device further includes an airtight chamber filled with dry gas, and the substrate stage, the support and the first temperature adjustment device are located within the airtight chamber.

10. The liquid crystal filling device according to claim 9, wherein
 the dry gas is nitrogen.

11. A liquid crystal panel manufacturing apparatus, including the liquid crystal filling device of claim 5.

12. The liquid crystal panel manufacturing apparatus according to claim 11, wherein
 the dry gas is nitrogen.

* * * * *